Sept. 14, 1948.  F. C. STIEBER  2,449,424
ADJUSTABLE FRICTION SUPPORTING DEVICE
Filed Nov. 25, 1946  2 Sheets-Sheet 1
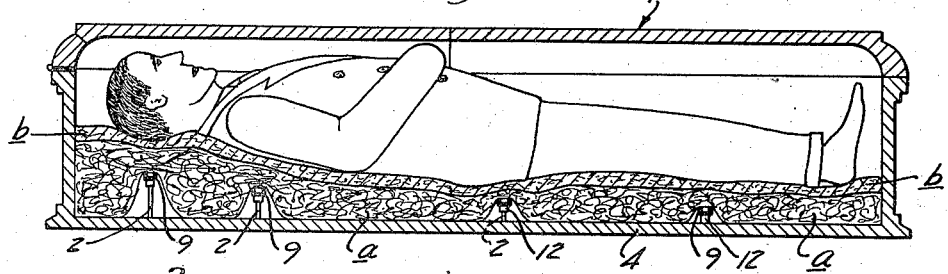
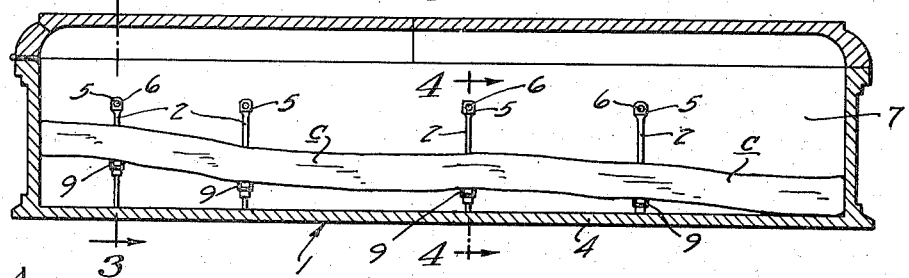
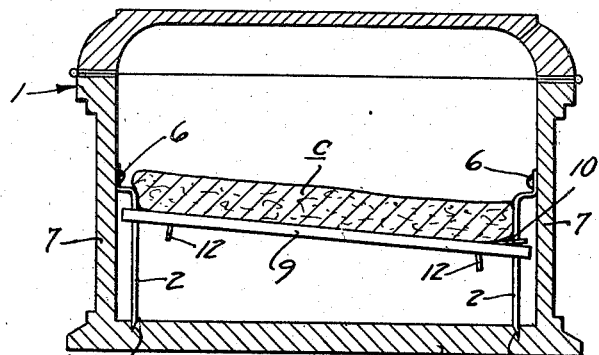
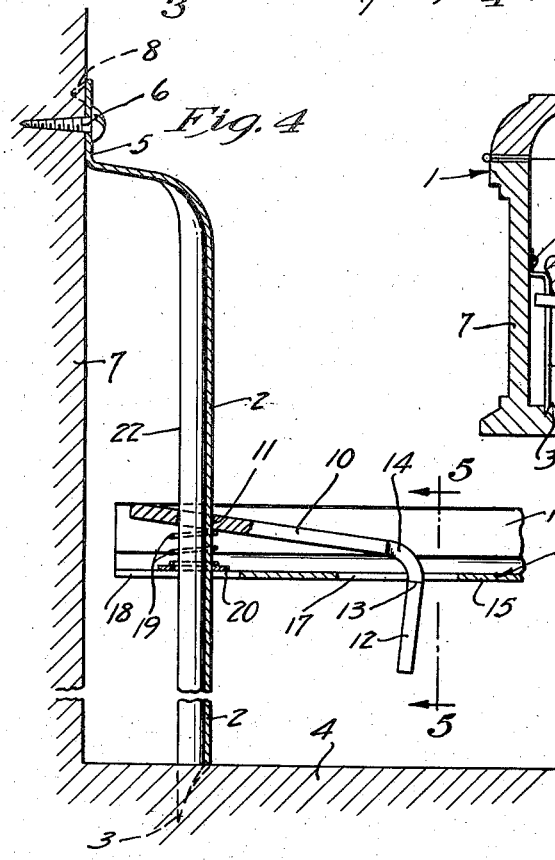
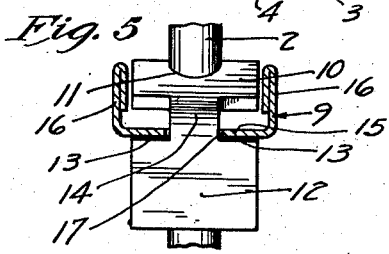
Inventor
Frank C. Stieber
By his Attorneys
Merchant & Merchant

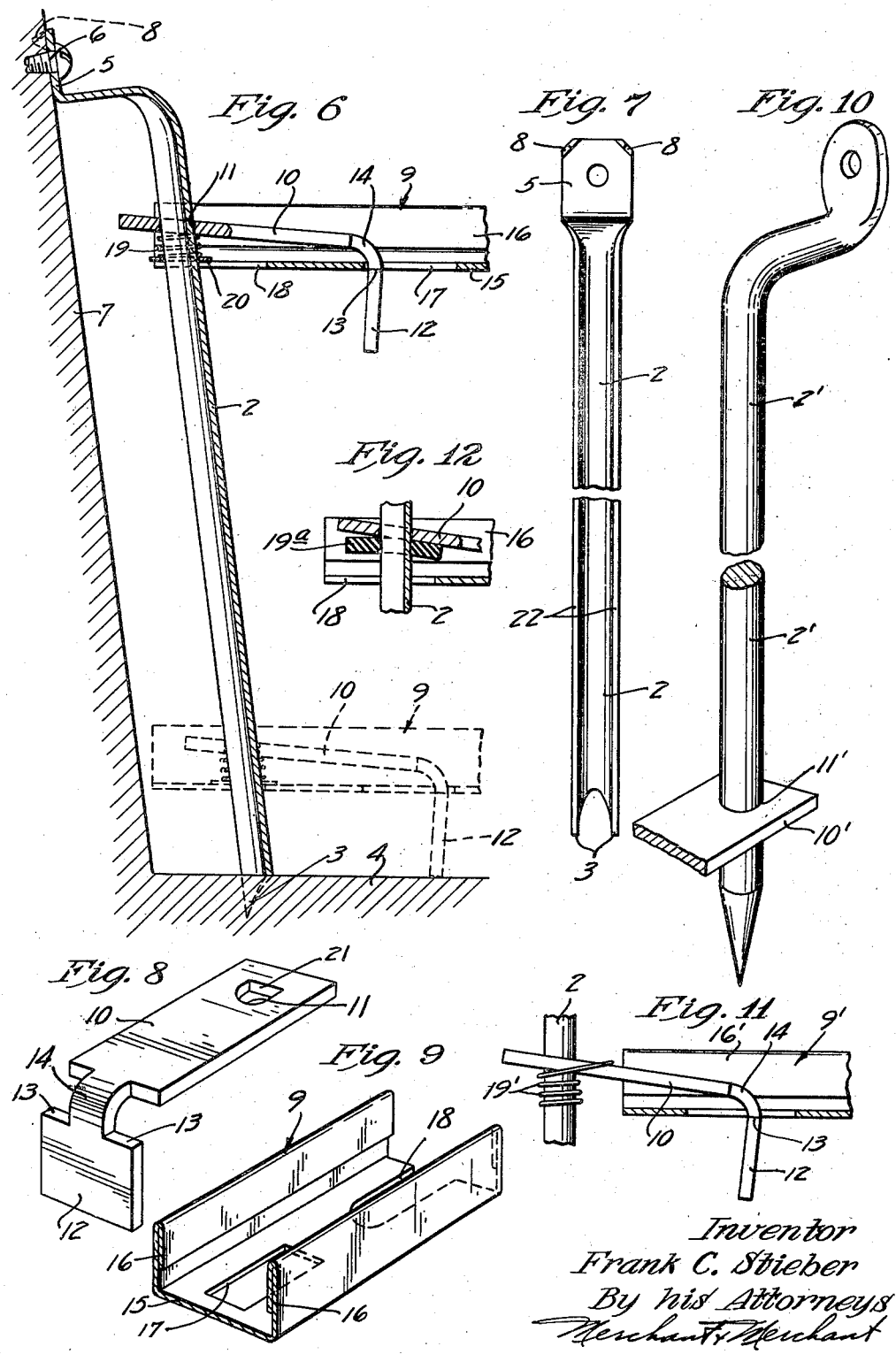

Patented Sept. 14, 1948

2,449,424

UNITED STATES PATENT OFFICE 2,449,424

ADJUSTABLE FRICTION SUPPORTING DEVICE

Frank C. Stieber, Marathon, Wis.

Application November 25, 1946, Serial No. 712,103

7 Claims. (Cl. 248—295)

My invention relates to adjustable friction supporting devices and has for its primary object the provision of devices of this kind that are inexpensive to manufacture, simple in construction, easy to install, extremely durable, positive in their supporting action, and capable of infinite adjustment within given limits.

Another important object of the invention is the provision of a support including a beam or equivalent supporting element, and means for adjustably anchoring the same to a relatively fixed structure with freedom for adjusting movements of one side or end thereof with respect to the other.

In the preferred embodiment of the invention, illustrated, a beam, bar, shelf, or equivalent supporting element is vertically adjustably supported or anchored to a relatively-fixed structure through the medium of supporting posts carried by the relatively-fixed structure and friction devices adjustably connecting the said beam or equivalent supporting element to the support for up and down sliding action thereon. Opposite ends of the beam or equivalent supporting element are adjustably independent, one of the other, on the supporting post and the improved arrangement has the further advantage of being freely adjustable on the supporting posts irrespective of some or even considerable angularity between supporting posts at opposite ends of the beam or equivalent supporting element.

While the invention has been found highly desirable for use as an adjustable body support for use in caskets and is herein illustrated as such, it should, nevertheless, be understood that the invention is also adapted for a wide range of other uses, among which is an adjustable support for shelves and the like.

The above and numerous other objects and advantages of the invention will be made apparent from the following specification, appended claims and attached drawings.

In the accompanying drawings, like characters indicate like parts throughout the several views.

Referring to the drawings:

Fig. 1 is a vertical section taken longitudinally through a burial casket and illustrating a plurality of supporting devices of my invention used to support a body or corpse therein through the medium of interposed loose fill, such as excelsior or the like;

Fig. 2 is a view corresponding closely to Fig. 1, but with the corpse omitted and illustrating a mattress overlying and directly supported by a plurality of supporting devices of the instant invention;

Fig. 3 is a transverse sectional view taken on the line 3—3 of Fig. 2, but showing the mattress and beams in raised and tilted positions, as for the purpose of display;

Fig. 4 is a fragmentary section on an enlarged scale taken on the line 4—4 of Fig. 2;

Fig. 5 is a detailed section taken on the line 5—5 of Fig. 4;

Fig. 6 is a view corresponding to Fig. 4, but showing my device applied to an angular side wall;

Fig. 7 is a rear elevation of the supporting post;

Fig. 8 is a view in perspective of the friction link of my supporting structure;

Fig. 9 is a fragmentary perspective view of one end of the supporting beam of my device;

Fig. 10 is a view in perspective showing a modified form of supporting post;

Fig. 11 is a fragmentary view corresponding to Fig. 4, showing a further modified form; and Fig. 12 is a fragmentary view illustrating a slight modification of the invention.

One of the numerous uses of my devices, as illustrated in the drawings, is its use in the supporting of a corpse within a casket, identified in its entirety by the numeral 1. Preferably, and as shown, a plurality of my adjustable supporting devices are spaced along the length of the casket at opposite sides, in order that the body may be held in the desired position within the casket for purposes of display, transportation, or the like. As shown in Figs. 1 and 2, I provide a plurality of opposed pairs of upstanding supporting posts 2 along opposite sides of the casket, the bottom ends 3 of which are anchored to the bottom 4 of the casket, and the upper ends 5 of which are secured to the side 7 of the casket. The anchoring of these posts 2 to the casket may be by any one well-known method, but when used in connection with wooden caskets, anchorage of the bottom ends 3 of the post 2 is preferably accomplished by sharpening the said ends of the post and driving the same into the bottom of the casket, and the upper ends of said posts are preferably anchored to the sides of such wooden caskets by screws, bolts or the like 6. In the case of metal caskets, the posts may be anchored at both ends by screws or by welding or the like. Preferably, and as shown, the upper ends 5 of posts 2 are provided with supplemental gripping prongs 8 for projection into the side walls 7 of wooden caskets.

Cooperating with each pair of posts 2 is a supporting beam 9, preferably, and as shown, being channel-shaped in cross section. The beams 9 are each supported from the post 2 by means of friction links 10 adjacent each end thereof. Each of the friction links 10 has an aperture 11 adjacent one end thereof in which the supporting posts 2 are longitudinally slidably mounted. On their opposite ends, friction links 10 are provided with angularly disposed heads 12 having opposed laterally aligned load-bearing tongues or shoulders 13. The head 12 is connected to the friction link 10 by reduced neck 14.

Channel-shaped beam 9 is provided with a bottom portion 15 and upwardly-projecting opposed side walls 16. The bottom 15 of supporting beam 9 is provided with an elongated longitudinally extending slot 17 adjacent each end thereof. Said slot 17 is of a width to receive the head 12 of friction link 10 when the same is turned substantially at right angles to its operating position, but is too narrow to allow passage therethrough of said head 12 when the head is in its operative position. In the operative position, the slot 17 receives the neck 14 and the shoulders 13 engage and support the bottom 15 of the beam 9 on both sides of the slot 17.

In the preferred embodiment of my invention, the extreme outer ends of the supporting beams 9 project beyond the supporting posts 2 and are provided with outwardly opening elongated slots 18 which receive the posts 2. Interposed between the bottom 15 of beams 9 and the undersurface of friction links 10 are compression coil springs 19 which encompass the post 2. A washer 20 may be interposed, if found desirable, between the bottom end of coil spring 19 and the bottom 15 of the beam 9.

For the purpose of preventing partial rotation of the friction link 10 with respect to the post 2, I preferably provide cooperating surfaces 21 and 22 in the aperture 11 and post 2 respectively.

Another feature of the invention which tends to prevent wobbling or rotation of the beam or friction link with respect to the supporting post 2 is the fact that the friction link 10 works closely within the confines of the laterally-spaced side walls 16 of the channel-shaped beam 9; and a still further feature tending to maintain a desired alignment of the friction link 10 and beam 9, in some forms of the invention illustrated, is engagement of opposite sides of beam slot 18 with the supporting post 2 (see Fig. 6, for example). In the preferred embodiment of the invention exemplified in Fig. 6, for example, I utilize all three of the above-described means for maintaining the elements against wobbling or partial rotation. However, a simplified form of construction may be used, if desired, and is shown in Fig. 10 wherein I illustrate a supporting bar 2' which is circular in cross section, and which is longitudinally slidably mounted in a circular aperture 11' of the friction link 10'. In this construction, the close cooperation between the link 10' and the side walls of the channel 9, together with the guiding action of the sides of slot 18 in the bottom 15 of the beam 9 with the post, are relied upon to maintain alignment of the link and beam.

In the modified form shown in Fig. 11, a beam 9' terminates short of the post 2 and relies upon the cooperation between the friction link 10 and the sides 16' of channel 9', together with the cooperating surfaces 21 and 22 in the friction link 10 and post 2, respectively. As there shown, a coil spring 19' has its upper end hooked over the top of the link 10 adjacent the post 2 to bias the link 10 in a downward post-gripping direction.

As hereinbefore stated, one or more sets of posts 2, with their cooperating friction links 10 and beams 9, are utilized, depending upon the nature of the article to be supported thereby. To raise one or both ends of a supporting beam 9, it is but necessary to exert lifting pressure upon the beam, for when this is done, the spring of the lifted end of the beam will yield to permit releasing of the friction link and upward sliding action of the unit on the post. However, to lower either or both ends of a beam, it will be necessary to manually press the friction link toward the beam against the action of a cooperating spring and into approximately parallel relation with the beam in order to release the friction link from its gripping action on the post. From the above, it will be apparent that both ends of the beam 9 may be adjusted to an infinite number of positions on its post.

In the event that it is necessary or desirable to secure either or both of the supporting posts 2 to a slanting wall, then and in that event, the reduced neck portion 14 of the friction link 10, and the post 2, operate in the longitudinally-extending slots 17 and 18 respectively to automatically compensate for changes in distance between posts 2 (see Fig. 6). Of course, when one or the other ends of a beam are raised or lowered with respect to the other thereof, this same compensating action will take place (see Fig. 3, for example).

In Fig. 1, four sets of my novel supporting devices are shown as being used to adjustably support a corpse through the medium of inexpensive loose fill, such as excelsior or hay $a$, covered with a thin layer of cotton batting $b$, these supporting devices being located at the four critical supporting points. As will be seen, particularly by reference to Fig. 2, all four of the beams 9 have been elevated to different positions in order to properly and positively support the corpse or body in the desired position. In Fig. 2, the mattress $c$ has been substituted for the loose fill and the cotton batting $b$ or the like of Fig. 1, and while a conventional casket mattress may be used for this purpose, a mattress having somewhat firmer qualities is preferably embodied so as to provide a greater degree of support intermediate the spaced beams. Figs. 1 and 2 show the supporting devices positioned as for transportation of the body, whereas Fig. 3 shows the supporting beams 9 elevated and tilted to one side as for viewing or display of the body. While a mattress of Fig. 2 is shown in Fig. 3, it will be appreciated that the same elevating and tilting results can be accomplished with the loose fill and padding of Fig. 1.

To either raise or lower the body or to tilt or otherwise adjust the individual beams 9, it is only necessary for the operator to slip his hand alongside of the mattress or loose fill, as the case may be, and manipulate the ends of the beams 9 as previously described.

In the modification of Fig. 12, a resilient friction ring 19a has been substituted for the spring 19 of Fig. 6, but otherwise the parts illustrated in Fig. 12 are identical to corresponding parts of Fig. 6, and are indicated by like characters. The said friction ring 19a of Fig. 12 may be of rubber, leather, or other resilient material and is applied around and snugly grips the post 2 with sufficient friction to move the friction link 10 into positive gripping relation with the post 2 as a result of downward pressure exerted on the beam 16. However, the friction ring 19a will slide upwardly on the post as a result of manual lifting action on the beam 16. In this respect attention is called to the fact that the washer-like friction ring 19a overlaps and will not pass through the open notch or slot 18 in the end of the beam 16.

By reference to the drawings, it will be seen that the angularly disposed heads 12 of the friction links 10 project considerably below the bottom surfaces of the beams 9 and 9', and by reference particularly to dotted lines in Fig. 6, it will be seen that these downwardly-projecting heads 12 of the friction links serve as legs to limit downward movements of the beams. This feature of the invention is important in that finger space is thus assured when the beams are in their lowermost positions, thus giving the operator easy access to the under surface of the beams for the purpose of lifting the same.

What I claim is:

1. An adjustable support comprising a friction link having a post-receiving aperture adjacent one end and opposed laterally-projecting load-bearing tongues adjacent its other end, a supporting post extending through the aperture of the friction link and mounting said link for sliding movements thereon, and a beam having an aperture adjacent one end through which the tongue-equipped end of the friction link extends, portions of the beam adjacent opposite edges of the said beam aperture being seated upon the said load-bearing tongues of the friction link, said beam aperture being of sufficient length in a direction longitudinally of the friction link to receive the tongue-equipped end of the friction link when the friction link is turned approximately at right angles to its operative position.

2. An adjustable support comprising an elongated friction link having a post-receiving aperture adjacent one end and an angularly disposed head adjacent its other end, said head having opposed laterally aligned load-bearing shoulders, a supporting post extending through the aperture of the friction link and mounting said link for sliding movements thereon., and a beam having portions slidably bearing upon the load-bearing shoulders of the friction link head.

3. An adjustable support comprising a friction link having a post-receiving aperture adjacent one end and an angularly disposed head adjacent its other end, said head being formed to afford opposite laterally-extending load-bearing shoulders, a supporting post extending through the aperture of the friction link and mounting said link for sliding movements thereon, and a beam having an elongated parallel sided aperture adjacent one end through which the angularly disposed head of the friction link extends, portions of the beam adjacent opposite longitudinal edges of the beam aperture being seated upon the load-bearing shoulders of the friction link, whereby to permit vertical adjustments of the beam with respect to the post when the beam is diagonally disposed with respect to the post.

4. An adjustable support comprising a friction link having a post-receiving aperture adjacent one end and an angularly disposed head adjacent its other end, said head being formed to provide opposite laterally-projecting load-bearing shoulders, a supporting post extending through the aperture of the friction link and mounting said link for sliding movements thereon, a channel-shaped beam extended generally perpendicularly to the post, the side flanges of said channel-shaped beam embracing opposite sides of the friction link, the bottom of said channel-shaped beam being provided with a longitudinally extending elongated aperture through which the angularly disposed head end of the link is projected, the shoulder-equipped portion of the head being of greater width than the beam aperture, portions of the beam adjacent the aperture being slidably seated upon the shoulders of the link head, and yielding means biasing the friction link toward an inclined post gripping position.

5. The structure defined in claim 4 in which the said beam projects beyond the post and is provided with an elongated post-receiving aperture.

6. An adjustable support comprising a friction link having a post-receiving aperture adjacent one end and an angularly disposed head adjacent its other end, said head being formed to afford opposite laterally-extending load-bearing shoulders, a supporting post extending through the aperture of the friction link and mounting said link for sliding movements thereon, and a beam having an elongated parallel sided aperture adjacent one end through which the angularly disposed head of the friction link extends, portions of the beam adjacent opposite longitudinal edges of the beam aperture being seated upon the load-bearing shoulders of the friction link, whereby to permit vertical adjustments of the beam with respect to the post when the beam is diagonally disposed with respect to the post, said beam projecting beyond the post and being provided with an elongated post-receiving aperture in the nature of a notch opening through the end of the bottom of the beam.

7. In a device of the class described, a friction link having a post-receiving aperture adjacent one end and a downturned head adjacent its other end having an upper surface providing a supporting shoulder upwardly spaced from its lower end, a supporting post extending through the aperture of the friction link and mounting said link for sliding movements thereon, and a beam apertured to receive a portion of the friction link adjacent the head of the friction link and seated upon the said shoulder provided by the friction link head, the depending head of the friction link serving to definitely limit downward adjusting movements of the beam on the post.

FRANK C. STIEBER.

REFERENCES CITED

The following references are of record in the file of this patent:

FOREIGN PATENTS

| Number | Country | Date |
| --- | --- | --- |
| 27,495 | Great Britain | Dec. 12, 1907 |